United States Patent
Nagasawa et al.

(10) Patent No.: US 7,388,066 B2
(45) Date of Patent: Jun. 17, 2008

(54) GOLF BALL

(75) Inventors: Hiroyuki Nagasawa, Chichibu (JP);
Yoshihiro Yamana, Tokyo (JP);
Hidekazu Saito, Kurashiki (JP); Hiroki Kimura, Kurashiki (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 303 days.

(21) Appl. No.: 11/234,221

(22) Filed: Sep. 26, 2005

(65) Prior Publication Data

US 2007/0073031 A1 Mar. 29, 2007

(51) Int. Cl.
*A63B 37/12* (2006.01)
*C08G 18/44* (2006.01)

(52) U.S. Cl. .............. 528/76; 528/85; 473/378

(58) Field of Classification Search ............ None
See application file for complete search history.

(56) References Cited

U.S. PATENT DOCUMENTS

| | | | |
|---|---|---|---|
| 4,013,702 A | 3/1977 | Cartier et al. | |
| 4,105,641 A | 8/1978 | Buysch et al. | |
| 6,177,522 B1 * | 1/2001 | Brady et al. ........ | 525/452 |
| 6,663,510 B1 | 12/2003 | Iwami et al. | |
| 6,737,498 B2 | 5/2004 | Harris et al. | |
| 6,739,987 B2 | 5/2004 | Harris et al. | |
| 6,806,323 B2 | 10/2004 | Ichikawa et al. | |
| 6,846,898 B2 | 1/2005 | Yokota | |
| 2005/0004325 A1 * | 1/2005 | Wu et al. ............ | 525/462 |
| 2006/0252578 A1 * | 11/2006 | Nagasawa et al. ..... | 473/371 |

FOREIGN PATENT DOCUMENTS

JP 2002-272878 A 9/2002
JP 2002-336380 A 11/2002

OTHER PUBLICATIONS

Polymer Review, vol. 9, pp. 9-20, (1964) by Schnell.

\* cited by examiner

*Primary Examiner*—David Buttner
(74) *Attorney, Agent, or Firm*—Sughrue Mion, PLLC

(57) ABSTRACT

In a golf ball composed of a core and one or more cover layers which enclose the core, at least one cover layer is made primarily of a thermoplastic polyurethane obtained by a polyurethane forming reaction of an organic polyisocyanate compound with a long-chain polyol and a chain extender, and satisfies conditions (1) to (3) below:

(1) the long-chain polyol includes a copolymeric polycarbonate polyol having a number-average molecular weight of 400 to 4,000;
(2) the thermoplastic polyurethane present in the cover material (after molding) has an inherent viscosity, as measured in DMF, of more than 1.5 dl/g; and
(3) the thermoplastic polyurethane present in the cover material (after molding) has an inherent viscosity, as measured in a DMF solution containing 0.05 mol/L of n-butylamine, of at least 0.5 dl/g.

The golf ball has an improved scuff resistance, particularly an improved low-temperature scuff resistance.

6 Claims, No Drawings

GOLF BALL

BACKGROUND OF THE INVENTION

The present invention relates to a golf ball of excellent manufacturability, excellent spin and improved scuff resistance, particularly low-temperature scuff resistance, in which the cover is made using a thermoplastic polyurethane.

Golf balls having a urethane cover are widely used today not only by professional golfers and highly skilled amateurs, but also by beginners and amateur golfers of intermediate skill. Compared with the ionomers commonly used in golf ball covers, urethanes tend to confer golf balls with better spin properties, controllability and low-temperature properties. However, there still remains room for improvement in the low-temperature scuff resistance of these golf balls.

Here, polyurethane materials are broadly divided, based on the process used to make molded articles, into thermoset polyurethane materials and thermoplastic polyurethane materials. Numerous golf balls which use a thermoset polyurethane material have been disclosed in the prior art, including Patent Reference 1: JP-A 2002-272878; Patent Reference 2: U.S. Pat. No. 6,663,510; and Patent Reference 3: U.S. Pat. No. 6,737,498. Patent Reference 1 describes a golf ball which uses as the cover stock a thermoset polyurethane material in which a polycarbonate polyol is employed as the polyol component. Because polycarbonate polyol has excellent heat resistance, weather resistance and water resistance, such golf balls are able to maintain their ball characteristics even under harsh conditions such as rainy weather, extreme heat and scorching sun. However, in the molding of such a thermoset polyurethane material, the heat setting step and the cooling step take a long time. Additional drawbacks include the high reactivity under heating—and thus low stability—of the starting materials, which makes the molding time difficult to control. Thermoset polyurethane materials of this type are thus regarded as having poor productivity when used in the fabrication of specialty moldings such as golf ball covers for enclosing a core.

On the other hand, thermoplastic polyurethane materials are desirable as golf ball cover materials because they can be molded using an injection molding machine, have a short molding time, and are amenable to precision molding. Golf balls using such materials are disclosed in, for example, Patent Reference 4: U.S. Pat. No. 6,739,987 and Patent Reference 5: JP-A 2002-336380. The golf ball described in Patent Reference 4 is a ball composed of a core and a cover, wherein at least the core or cover includes a silicone-urethane copolymer which contains polycarbonate soft segments. The golf ball described in Patent Reference 5 is a golf ball composed of a core enclosed by a cover, the cover being composed primarily of a thermoplastic polyurethane material which contains a polyether polyol having an average molecular weight of at least 1500 and a polyisocyanate, and has a rebound resilience of at least 40%.

However, although the prior art such as above Patent Reference 5 describes a golf ball having both rebound resilience and scuff resistance, there still remains room for improvement in the low-temperature scuff resistance. Hence, a need exists for a way to impart even better low-temperature scuff resistance to golf balls made using thermoplastic polyurethane materials which are injection moldable and provide desirable properties such as excellent ball controllability.

SUMMARY OF THE INVENTION

The object of the invention is to provide a golf ball having improved scuff resistance, particularly low-temperature scuff resistance.

As a result of extensive investigations, we have found that a golf ball which is composed of a core enclosed by one or more cover layers and satisfies the above object can be achieved by forming at least one cover layer primarily of a thermoplastic polyurethane elastomer that has specific viscosity properties and is prepared using a specific long-chain polyol as the starting material.

Accordingly, the invention provides the following golf balls.

[I] A golf ball composed of a core and one or more cover layers which enclose the core, the ball being characterized in that at least one cover layer is made primarily of a thermoplastic polyurethane obtained by a polyurethane forming reaction of an organic polyisocyanate compound with a long-chain polyol and a chain extender, and satisfies conditions (1) to (3) below:

(1) the long-chain polyol includes a copolymeric polycarbonate polyol having a number-average molecular weight of 400 to 4,000;

(2) the thermoplastic polyurethane present in the cover material (after molding) has an inherent viscosity, as measured in DMF, of more than 1.5 dl/g; and (3) the thermoplastic polyurethane present in the cover material (after molding) has an inherent viscosity, as measured in a DMF solution containing 0.05 mol/L of n-butylamine, of at least 0.5 dl/g.

[II] The golf ball of [I], wherein the thermoplastic polyurethane has a Shore D hardness of 35 to 70 and the copolymeric polycarbonate polyol includes at least one selected from the groups consisting of poly(pentamethylene-co-hexamethylene carbonate) diol, poly(tetramethylene-co-hexamethylene carbonate) diol, poly(3-methyl-1,5-pentamethylene-co-hexamethylene carbonate) diol, poly(nonamethylene-co-hexamethylene carbonate) diol and poly(2-methyl-1,8-octamethylene-co-nonamethylene carbonate) diol.

[III] The golf ball of [I], wherein the long-chain polyol additionally includes polytetramethylene glycol.

[IV] The golf ball of [I], wherein the copolymeric polycarbonate polyol accounts for 10 to 100 wt % of the long-chain polyol.

[V] The golf ball of [II], wherein the hexamethylene carbonate unit content as a proportion of the copolymeric polycarbonate polyol is 1 to 80 wt %.

[VI] The golf ball of [I], wherein the thermoplastic polyurethane accounts for at least 90 wt % of the cover material.

DETAILED DESCRIPTION OF THE INVENTION

The invention is described more fully below.

The golf ball of the invention is composed of a core and one or more cover layers which enclose the core, and is characterized in that at least one cover layer is made primarily of a thermoplastic polyurethane obtained by a polyurethane forming reaction of an organic polyisocyanate compound with a long-chain polyol and a chain extender, and satisfies the following conditions: (1) the long-chain polyol includes a copolymeric polycarbonate polyol having a number-average molecular weight of 400 to 4,000; (2) the thermoplastic polyurethane present in the cover material (after molding) has an inherent viscosity, as measured in DMF, of more than 1.5 dl/g; and (3) the thermoplastic polyurethane present in the cover material (after molding) has an inherent viscosity, as measured in a DMF solution containing 0.05 mol/L of n-butylamine, of at least 0.5 dl/g.

As used herein, the above-described "DMF" stands for N,N-dimethylformamide. The inherent viscosity in DMF of the thermoplastic polyurethane present in the cover material (after molding) is computed based on the efflux time measured at 30° C. for a solution prepared by dissolving the above-described cover material (after molding) in DMF to a concentration of 0.5 g/dl. The inherent viscosity in a DMF solution containing 0.05 mol/L of n-butylamine of the thermoplastic polyurethane present in the cover material (after molding) is computed based on the efflux time measured at 30° C. for a solution prepared by dissolving the above-described cover material (after molding) in a 0.05 mol/L n-butylamine-containing DMF solution to a concentration of 0.5 g/dl. These values are measured by the methods described subsequently in the "Examples" section. The thermoplastic polyurethane present in the cover material (after molding) has an inherent viscosity, as measured in DMF, of more than 1.5 dl/g, preferably at least 1.7 dl/g, more preferably a least 1.9 dl/g, and even more preferably at least about 2 dl/g, at which point the thermoplastic polyurethane becomes substantially insoluble in DMF.

The thermoplastic polyurethane present in the cover material (after molding) has an inherent viscosity, as measured in a DMF solution containing 0.05 mol/L of n-butylamine, of at least 0.5 dl/g, preferably at least 0.6 dl/g, more preferably 0.7 to 2.0 dl/g, and even more preferably 0.8 to 1.5 dl/g. Golf balls made using thermoplastic polyurethanes with inherent viscosities in these ranges have an especially outstanding low-temperature scuff resistance.

The thermoplastic polyurethane of which the cover material is primarily made includes soft segments composed of a long-chain polyol and hard segments composed of a chain extender and an organic polyisocyanate compound.

Copolymeric polycarbonate polyols that may be used in the invention are polycarbonate polyols composed of units derived from two or more low-molecular-weight polyols and carbonate units which may be derived from a carbonic acid diester of a lower alcohol (e.g., methanol). For ease of handling and to introduce onto the backbone of the resulting polycarbonate polyol a degree of disorder that disrupts crystallinity, it is advantageous to use as the low-molecular-weight polyols a combination of two or more alkanediols having 4 to 9 carbons.

Specific examples of alkanediols having 4 to 9 carbons include 1,4-butanediol, 1,5-pentanediol, 2-methyl-1,3-propanediol, neopentyl glycol, 1,6-hexanediol, 3-methyl-1,5-pentanediol, 2-ethyl-1,3-propanediol, 2-methyl-1,8-octanediol and 1,9-nonanediol. From the standpoint of ensuring the rebound characteristics of the resulting golf ball, it is preferable to use 1,4-butanediol, 1,5-pentanediol, 3-methyl-1,5-pentanediol, 1,6-hexanediol, 2-methyl-1,8-octanediol or 1,9-nonanediol.

Specific examples of the copolymeric polycarbonate polyol include poly(pentamethylene-co-hexamethylene carbonate) diol obtained using 1,5-pentanediol and 1,6-hexanediol (wherein the molar ratio of 1,5-pentanediol/1,6-hexanediol=10/90 to 90/10), poly(tetramethylene-co-hexamethylene carbonate)diol obtained using 1,4-butanediol and 1,6-hexanediol (wherein the molar ratio of 1,4-butanediol/1,6-hexanediol=10/90 to 90/10), poly(3-methyl-1,5-pentamethylene-co-hexamethylene carbonate)diol obtained using 3-methyl-1,5-pentanediol and 1,6-hexanediol (wherein the molar ratio of 3-methyl-1,5-pentanediol/1,6-hexanediol=10/90 to 90/10), poly(nonamethylene-co-hexamethylene carbonate)diol obtained using 1,9-nonanediol and 1,6-hexanediol (wherein the molar ratio of 1,9-nonanediol/1,6-hexanediol=10/90 to 90/10), and poly(2-methyl-1,8-octamethylene-co-nonamethylene carbonate) diol obtained using 2-methyl-1,8-octanediol and 1,9-nonanediol (wherein the molar ratio of 2-methyl-1,8-octanediol/1,9-nonanediol=10/90 to 90/10. In the invention, the copolymeric polycarbonate polyol may be used singly or as a combination of two or more thereof.

In the practice of the invention, when a copolymeric polycarbonate polyol having hexamethylene carbonate units is used, the hexamethylene carbonate unit content as a proportion of the copolymeric polycarbonate polyol is generally from 1 to 80 wt %, preferably from 3 to 70 wt %, and more preferably from 5 to 60 wt %. If the hexamethylene carbonate unit content is too low, the resulting golf ball may have a poor rebound characteristics. On the other hand, if this content is too high, the low-temperature scuff resistance may be poor.

In the invention, the above copolymeric polycarbonate polyol has a number-average molecular weight of 400 to 4,000, preferably 800 to 3,500, and more preferably 1,000 to 3,000. At too small a number-average molecular weight, the golf ball of the invention will have a poor rebound characteristics or, if the cover has a high hardness, a poor durability to impact. As used herein, the number-average molecular weight is a value determined from the hydroxyl number. The hydroxyl number is a value measured in accordance with JIS K1557.

In the practice of the invention, the method of preparing the copolymeric polycarbonate polyol is not subject to any particular limitation. For example, use can be made of the various methods described in U.S. Pat. No. 4,013,702, in U.S. Pat. No. 4,105,641, and by Schnell in *Polymer Reviews* 9, 9-20 (1964). It is also possible for the copolymeric polycarbonate polyol used in the invention to be a commercial product, such as a copolymeric polycarbonate diol produced by Kuraray Co., Ltd. (e.g., grades C-1050 and C-2065N) or a copolymeric polycarbonate diol produced by Asahi Kasei Chemicals Corporation (e.g., grades T5652 and T4692).

In addition to the above-described copolymeric polycarbonate polyol, to improve the rebound characteristics of the golf ball, the long-chain polyol in the invention may include also other polyols. Illustrative examples of other polyols include polytetramethylene glycol (sometimes abbreviated below as "PTMG") and poly(methyltetramethylene glycol).

The above-described copolymeric polycarbonate polyol accounts for generally 10 to 100 wt %, preferably 20 to 100 wt %, and more preferably 30 to 100 wt %, of the long-chain polyol. If the copolymeric polycarbonate polyol content of the long-chain polyol is too low, a low-temperature property-improving effect may fail to arise.

The organic polyisocyanate compound used in the invention may be an organic polyisocyanate that has hitherto been used for preparing polyurethanes. Such organic polyisocyanates include aromatic polyisocyanates having 6 to 20 carbons (exclusive of the carbons on the isocyanate groups; the same applies below), aliphatic polyisocyanates having 2 to 18 carbons, alicyclic polyisocyanates having 4 to 15 carbons, aromatic aliphatic polyisocyanates having 8 to 15 carbons, modified forms of these polyisocyanates (e.g., carbodiimide compounds, urethane compounds and urethodione compounds), and mixtures of any two or more thereof.

Illustrative examples of the above aromatic polyisocyanates include 1,3- and/or 1,4-phenylene diisocyanate, 2,4- and/or 2,6-tolylene diisocyanate, 2,4' and/or 4,4'-diphenylmethane diisocyanate (sometimes abbreviated below as "MDI"), 4,4'-diisocyanatobiphenyl, 3,3'-dimethyl-4,4'-diisocyanatobiphenyl, 3,3'-dimethyl-4,4'-diisocyanatodiphenylmethane and 1,5-naphthylene diisocyanate.

Illustrative examples of the above aliphatic polyisocyanates include ethylene diisocyanate, tetramethylene diisocyanate, hexamethylene diisocyanate, dodecamethylene diisocyanate, 2,2,4-trimethylhexamethylene diisocyanate, lysine diisocyanate (LDI), 2,6-diisocyanatomethylcaproate and 2-isocyanatoethyl-2,6-diisocyanatohexanoate.

Illustrative examples of the above alicyclic polyisocyanates include isophorone diisocyanate, dicyclohexylmethane-4,4'-diisocyanate, cyclohexylene diisocyanate, methylcyclohexylene diisocyanate and 2,5- and/or 2,6-norbornane diisocyanate.

Illustrative examples of the above aromatic aliphatic polyisocyanates include m- and/or p-xylylene diisocyanate and α,α,α',α'-tetramethylxylylene diisocyanate.

To achieve a good balance between stability during production and the properties manifested, it is preferable for the organic polyisocyanate compound employed in the invention to be an aromatic diisocyanate. The use of MDI is especially preferred.

Illustrative examples of the chain extender used in the invention include aliphatic diols such as ethylene glycol, propylene glycol, 1,3-butylene glycol, 1,4-butanediol, 3-methyl-1,5-pentanediol, 1,6-hexanediol, diethylene glycol and neopentyl glycol, alicyclic diols such as 1,4-bis(hydroxymethyl)cyclohexane, aromatic diols such as 1,4-bis(hydroxyethyl)benzene, aliphatic diamines such as ethylenediamine, alicyclic diamines such as isophoronediamine, aromatic diamines such as 4,4'-diaminodiphenylmethane, aromatic aliphatic diamines such as xylenediamine, alkanolamines such as ethanolamine, hydrazine, and dihydrazides such as adipic acid dihydrazide. These may be used singly or as combinations of two or more thereof. Of the above chain extenders, aliphatic diols having 2 to 12 carbons are preferred. Ethylene glycol, 1,4-butanediol, 1,6-hexanediol, or a mixture of two or more thereof, is more preferred. The chain extender has a molecular weight of preferably not more than 250.

The thermoplastic polyurethane may be one formed using a shortstopper (e.g., a monoalcohol such as methanol, butanol or cyclohexanol; or a monoamine such as methylamine, butylamine or cyclohexylamine), a catalyst commonly used in polyurethane forming reactions (e.g., an amine catalyst such as triethylamine or triethylenediamine, or a tin catalyst such as dibutyltin dilaurate or dioctyltin dilaurate). The amount of catalyst used, based on the resulting thermoplastic polyurethane, is generally not more than 1 wt %.

The above-described thermoplastic polyurethane used in the invention is one obtained by a polyurethane forming reaction of the above-described organic polyisocyanate compound with the long-chain polyol and the chain extender. The method used to prepare the thermoplastic polyurethane may be a conventional method, examples of which include a one-shot process in which the long-chain polyol, the organic polyisocyanate compound and the chain extender are all reacted at the same time; and a prepolymer process in which first the long-chain polyol and the organic polyisocyanate compound are reacted to form a polyurethane prepolymer, which is then reacted with the chain extender. Of these, the use of a one-shot process is preferred for ensuring that the resulting polymer has a stable quality and good productivity. The temperature conditions of the polyurethane forming reaction are not subject to any particular limitation. For example, the temperature conditions of 20 to 250° C. may be used.

The thermoplastic polyurethane in the invention has a resin hardness., expressed as the Shore D hardness, of generally 35 to 70, preferably 37 to 65, and more preferably 40 to 60. If the hardness of the thermoplastic polyurethane is too low, the amount of spin by the golf ball may be excessive, lowering the carry of the ball. On the other hand, a hardness that is too high may give the ball a poor feel on impact and lower its controllability. "Shore D hardness" refers herein to the Shore D hardness value obtained in accordance with ASTM D2240.

The above thermoplastic polyurethane has a rebound resilience of generally at least 20%, preferably at least 25%, and more preferably at least 30%. Because thermoplastic polyurethanes do not inherently have that good a resilience, it is desirable to scrupulously select the rebound resilience. If the cover layer formed from the cover material composed of this thermoplastic polyurethane has too low a rebound resilience, the distance traveled by the golf ball may decrease considerably. On the other hand, if the rebound resilience of the cover layer is too high, the initial velocity on shots of under 100 yards that require control and on putts may be too high and the feel of the ball when played may not agree with the golfer. "Rebound resilience" refers herein to the rebound resilience value obtained in accordance with JIS K7311.

At least one layer of the cover in the inventive golf ball is composed primarily of the above-described thermoplastic polyurethane. "Composed primarily of" signifies herein that the thermoplastic polyurethane accounts for at least 50 wt %, preferably at least 70 wt %, more preferably at least 90 wt %, and up to 100 wt %, of the cover layer in which it is used.

From the standpoint of, for example, adjusting the hardness of the cover layer, improving the resilience, improving the flow properties, and improving the adhesion, the cover layer composed primarily of the above-described thermoplastic polyurethane may be formulated using also a thermoplastic polymer other than the thermoplastic polyurethane. Illustrative examples of such thermoplastic polymers include polyester elastomers, polyamide elastomers, ionomer resins, styrene block elastomers, polyethylenes and nylon resins.

If necessary, various additives may also be formulated in the cover layer composed primarily of the above-described thermoplastic polyurethane. For example, pigments, dispersants, antioxidants, light stabilizers, ultraviolet light absorbers and parting agents may be suitably included.

At least one layer of the cover of one or more layer in the inventive golf ball is formed using a cover material composed primarily of the above-described thermoplastic polyurethane. However, to efficiently achieve the objects of the invention, it is preferable for at least the outermost layer (exclusive of any surface layers formed by coating or painting) to be formed using a cover material composed primarily of the above-described thermoplastic polyurethane.

In the practice of the invention, one exemplary method that may be used to enclose the core within the cover layer involves feeding the cover stock to an injection molding machine and injecting the molten cover stock around the core. The injection molding temperature in such a case is generally in a range of 150 to 250° C. If the injection molding is carried out, to suppress resin foaming during molding and also stabilize quality, it is desirable to carry out a nitrogen purge or vacuum treatment at some or all places on the resin paths from the resin feed area to the mold interior, and to carry out molding in a low-humidity environment.

The core used in the golf ball of the invention is not subject to any particular limitation. Examples of various cores that may be used include solid cores for two-piece balls, solid cores having a plurality of vulcanized rubber layers, solid cores having a plurality of resin layers, and thread-wound cores having a rubber thread layer. No particular limitation is imposed on the diameter, weight, hardness, constituent materials and other characteristics of the core.

In cases where the inventive golf ball has a construction that includes an intermediate layer, no particular limitation is imposed on the hardness, constituent materials, thickness and other characteristics of the intermediate layer. If necessary, a primer layer may be provided to improve adhesion between the intermediate layer and the cover.

It is preferable for the inventive golf ball to have a cover thickness within a range of 0.1 to 5.0 mm. The cover is not limited to a single layer, and may be formed so as to have a multilayer construction. If the cover is provided with a multilayer construction, the overall thickness of the cover may be set within the foregoing range.

The golf ball of the invention is preferably formed to a diameter and weight in accordance with the Rules of Golf, and is generally formed to a diameter of not less than 42.67 mm and a weight of not more than 45.93 g. The diameter is preferably from 42.67 to 42.9 mm. It is appropriate for deflection by the ball when subjected to a load of 980 N (100 kg) to be generally from 2.0 to 4.0 mm, and especially from 2.2 to 3.8 mm.

Examples 1 to 5, Comparative Examples 1 and 2

In each example, a core material of the composition indicated below was kneaded, then vulcanized and molded at 155° C. for 20 minutes to give a 38.5 mm diameter solid core for a two-piece solid golf ball. The polybutadiene rubber used was BROL produced by JSR Corporation. The resulting core had a specific gravity of 1.17 g/cm$^3$, a deformation of 3.4 mm when subjected to 980 N (100 kg) of loading, and an initial velocity as measured by the USGA (R&A) method of 78.1 m/s.

| Core Composition | |
|---|---|
| Polybutadiene rubber | 100 parts by weight |
| Zinc acrylate | 24.5 parts by weight |
| Zinc oxide | 12 parts by weight |
| Dicumyl peroxide | 1 part by weight |
| Zinc pentachlorothiophenol | 1 part by weight |

The starting materials shown in Table 1 below (units: parts by weight) were kneaded in a twin-screw extruder at a mixing temperature of 190 to 220° C. to form a cover stock. The solid core described above was placed within an injection-molding mold and the cover stock was injection-molded around the core, thereby giving a two-piece golf ball having a 2.1 mm thick cover layer with numerous dimples formed thereon. The golf balls thus obtained in the respective examples of the invention and comparative examples were left to stand at room temperature for one week, following which the ball properties were evaluated. The results are shown in Table 1.

TABLE 1

| (parts by weight) | | Example | | | | | Comparative Example | |
|---|---|---|---|---|---|---|---|---|
| | | 1 | 2 | 3 | 4 | 5 | 1 | 2 |
| Thermoplastic polyurethane | Polyurethane 1 | 100 | | | | | | |
| | Polyurethane 2 | | 100 | | | | | |
| | Polyurethane 3 | | | 100 | | | | |
| | Polyurethane 4 | | | | 100 | | | |
| | Polyurethane 5 | | | | | 100 | | |
| | Polyurethane 6 | | | | | | 50 | 50 |
| | Polyurethane 7 | | | | | | 50 | 50 |
| | Titanium oxide | 3 | 3 | 3 | 3 | 3 | 3 | 3 |
| | Polyethylene wax | 1 | 1 | 1 | 1 | 1 | 1 | 1 |
| | Isocyanate | | | | | | 20 | |
| Ball properties | Diameter (mm) | 42.72 | 42.74 | 42.74 | 42.24 | 42.71 | 42.73 | 42.70 |
| | Weight (g) | 46.14 | 46.38 | 46.44 | 46.10 | 45.77 | 45.65 | 45.70 |
| | Hardness (mm) | 2.85 | 2.89 | 2.88 | 2.78 | 2.79 | 2.86 | 2.90 |
| | Initial velocity (m/s) | 76.11 | 76.08 | 75.95 | 76.64 | 76.80 | 76.80 | 76.69 |
| | Scuff resistance 23° C. | 3 | 4 | 4 | 3 | 3 | 3 | 2 |
| | 13° C. | 4 | 4 | 5 | 3 | 3 | 3 | 2 |
| | 0° C. | 5 | 5 | 5 | 3 | 3 | 2 | 1 |
| | Manufacturability | good | good | good | good | good | NG | good |

As described above, the golf ball of the invention has an improved scuff resistance, particularly an improved low-temperature scuff resistance.

EXAMPLES

The following examples of the invention and comparative examples are provided by way of illustration and not by way of limitation.

Polyurethane 1

A polyurethane based on MDI-copolymeric polycarbonate polyol (using 1,4-butanediol as the chain extender) having a Shore D hardness of 52 and a rebound resilience of 30%. The copolymeric polycarbonate polyol included in this copolymer was T5652 produced by Asahi Kasei Chemicals Corporation and had a number-average molecular weight of 2,000. T5652 is poly(pentamethylene-co-hexamethylene carbonate) diol in which 1,5-pentanediol/1,6-hexanediol (molar ratio)=50/50. The thermoplastic polyurethane present in the cover material (sampled from golf balls held at room temperature for one week) prepared in Example 1 using this thermoplastic polyurethane had an inherent viscosity, as measured in DMF, of at least 2.0 dl/g and an inherent viscosity, as measured in a DMF solution containing 0.05 mol/l of n-butylamine, of 0.9 dl/g.

Polyurethane 2

A polyurethane based on MDI-copolymeric polycarbonate polyol (using 1,4-butanediol as the chain extender) having a Shore D hardness of 53 and a rebound resilience of 25%. The copolymeric polycarbonate polyol was T4692 produced by Asahi Kasei Chemicals Corporation and had a number-average molecular weight of 2,000. T4692 is poly(tetramethylene-co-hexamethylene carbonate) diol in which 1,4-butanediol/1,6-hexanediol (molar ratio)=90/10. The thermoplastic polyurethane present in the cover material (sampled from golf balls held at room temperature for one week) prepared in Example 2 using this thermoplastic polyurethane had an inherent viscosity in DMF of at least 2.0 dl/g and an inherent viscosity in a DMF solution containing 0.05 mol/l of n-butylamine of 0.9 dl/g.

Polyurethane 3

A polyurethane based on MDI-copolymeric polycarbonate polyol (using 1,4-butanediol as the chain extender) having a Shore D hardness of 47 and a rebound resilience of 25%. The copolymeric polycarbonate polyol was T4692 produced by Asahi Kasei Chemicals Corporation and had a number-average molecular weight of 2,000. The thermoplastic polyurethane present in the cover material (sampled from golf balls held at room temperature for one week) prepared in Example 3 using this thermoplastic polyurethane had an inherent viscosity in DMF of at least 2.0 dl/g and an inherent viscosity in a DMF solution containing 0.05 mol/l of n-butylamine of 0.9 dl/g.

Polyurethane 4

A polyurethane based on MDI-copolymeric polycarbonate polyol/PTMG (using 1,4-butanediol as the chain extender) having a Shore D hardness of 54 and a rebound resilience of 38%. The copolymeric polycarbonate polyol was T4692 produced by Asahi Kasei Chemicals Corporation and had a number-average molecular weight of 2,000. The long-chain polyol used was the mixture T4692/PTMG=50/50 (weight ratio). The thermoplastic polyurethane present in the cover material (sampled from golf balls held at room temperature for one week) prepared in Example 4 using this thermoplastic polyurethane had an inherent viscosity in DMF of at least 2.0 dl/g and an inherent viscosity in a DMF solution containing 0.05 mol/l of n-butylamine of 0.9 dl/g.

Polyurethane 5

A polyurethane based on MDI-copolymeric polycarbonate polyol/PTMG (using 1,4-butanediol as the chain extender) having a Shore D hardness of 54 and a rebound resilience of 46%. The copolymeric polycarbonate polyol was T4692 produced by Asahi Kasei Chemicals Corporation and had a number-average molecular weight of 2,000. The long-chain polyol used was the mixture T4692/PTMG=30/70 (weight ratio). The thermoplastic polyurethane present in the cover material (sampled from golf balls held at room temperature for one week) prepared in Example 5 using this thermoplastic polyurethane had an inherent viscosity in DMF of at least 2.0 dl/g and an inherent viscosity in a DMF solution containing 0.05 mol/l of n-butylamine of 0.9 dl/g.

Polyurethane 6 and Polyurethane 7

Polyurethane 6 was Pandex T8295 produced by DIC Bayer Polymer, Ltd. (a polyurethane based on MDI-PTMG made using 1,4-butanediol as the chain extender), which had a JIS-A hardness of 97 and a rebound resilience of 44%. This resin by itself had an inherent viscosity in DMF of 0.6 dl/g and an inherent viscosity in a DMF solution containing 0.05 mol/l of n-butylamine of 0.6 dl/g.

Polyurethane 7 was Pandex T8260 produced by DIC Bayer Polymer, Ltd. (a polyurethane based on MDI-PTMG made using 1,4-butanediol as the chain extender), which had a Durometer D hardness of 56 and a rebound resilience of 46%. This resin by itself had an inherent viscosity in DMF of 0.6 dl/g and an inherent viscosity in a DMF solution containing 0.05 mol/l of n-butylamine of 0.6 dl/g.

The thermoplastic polyurethane present in the cover material (sampled from golf balls held at room temperature for one week) prepared in Comparative Example 1 by mixing Polyurethanes 6 and 7 in a 50:50 ratio by weight and additionally incorporating isocyanate had an inherent viscosity in DMF of at least 2.0 dl/g and an inherent viscosity in a DMF solution containing 0.05 mol/l of n-butylamine of 0.8 dl/g.

The thermoplastic polyurethane present in the cover material (sampled from golf balls held at room temperature for one week) prepared in Comparative Example 2 by mixing Polyurethanes 6 and 7 in a 50:50 ratio by weight had an inherent viscosity in DMF of at least 0.6 dl/g and an inherent viscosity in a DMF solution containing 0.05 mol/l of n-butylamine of 0.6 dl/g.

The inherent viscosities in DMF and in a DMF solution containing 0.05 mol/l of n-butylamine were measured as described below.

Inherent Viscosity ($\eta_{inh}$) in DMF Solution of Thermoplastic Polyurethane (or Polyurethanes 6 and 7) Present in Cover Material (after Molding)

The cover materials (after molding) or Polyurethanes 6 and 7 in the respective examples of the invention and comparative examples were dissolved in DMF to a concentration of 0.5 g/dl, the efflux time at 30° C. of the solution was measured using an Ubbelohde viscometer, and the inherent viscosities ($\eta_{inh}$) of the thermoplastic polyurethanes present in the cover materials (after molding), or of Polyurethanes 6 and 7, were determined from the following formula.

$$\text{Inherent viscosity } (\eta_{inh}) = [\ln(t/t_0)]/c$$

In the formula, the letter t represents the efflux time (in seconds) for the solution, $t_o$ is the efflux time (in seconds) of the solvent (DMF), and c is the concentration (g/dl) of the thermoplastic polyurethane in the solution.

If the thermoplastic polyurethane was insoluble in DMF, the inherent viscosity was indicated as at least 2.0.

In cases where the cover material contained components other than the thermoplastic polyurethane, the inherent viscosity was measured after preparing the above solution as described below.

N,N-Dimethylformamide (DMF) was added to the cover material in a proportion of 40 ml per 0.2 g of the cover material and the mixture was stirred at room temperature for 24 hours, following which it was separated off by filtration, thereby recovering a DMF solution. The efflux time of the recovered DMF solution was measured using an Ubbelohde viscometer in the same way as above. Next, 5 ml of the recovered DMF solution was collected with a 5 ml transfer pipette, placed as a sample in a precisely weighed crucible, and the DMF was distilled away at 120° C., leaving a residue. The weight of the residue was then measured and the concentration c (g/dl) of thermoplastic polyurethane present in the cover material was determined.

Inherent Viscosity ($\eta_{inh-a}$) in 0.05 mol/L n-Butylamine-Containing DMF Solution of Thermoplastic Polyurethane (or Polyurethanes 6 and 7) Present in Cover Material (after Molding)

The cover materials (after molding) or Polyurethanes 6 and 7 in the respective examples of the invention and comparative examples were dissolved in a 0.05 mol/L n-butylamine-containing DMF solution to a concentration of 0.5 g/dl, the efflux time at 30° C. of the solution was measured using an Ubbelohde viscometer, and the inherent viscosities ($\eta_{inh-a}$) of the thermoplastic polyurethanes present in the cover materials (after molding), or of Polyurethanes 6 and 7, were determined from the following formula.

Inherent viscosity ($\eta_{inh-a}$)=[ln(t/t_0)]/c

In the formula, the letter t represents the efflux time (in seconds) for the solution, $t_0$ is the efflux time (seconds) of the solvent (0.05 mol/L n-butylamine-containing DMF solution), and c is the concentration (g/dl) of the thermoplastic polyurethane in the solution.

In cases where the cover material contained components other than the thermoplastic polyurethane, the inherent viscosity was measured after preparing the above solution as described below.

A N,N-Dimethylformamide (DMF) solution containing 0.05 mol/L of n-butylamine was added to the cover material in a proportion of 40 ml per 0.2 g of the cover material and the mixture was stirred at room temperature for 24 hours, following which it was separated off by filtration, thereby recovering a 0.05 mol/L n-butylamine-containing DMF solution of the cover material. The efflux time of the recovered solution was measured using an Ubbelohde viscometer in the same way as above. Next, 5 ml of the recovered solution was collected with a 5 ml transfer pipette, placed as a sample in a precisely weighed crucible, and the n-butylamine and DMF were distilled away at 120° C., leaving a residue. The weight of the residue was then measured and the concentration c (g/dl) of thermoplastic polyurethane present in the cover material was determined.

Titanium Oxide

Tipaque R550 (produced by Ishihara Sangyo Kaisha, Ltd.).

Polyethylene Wax

Sanwax 161P (produced by Sanyo Chemical Industries, Ltd.).

Isocyanate

Crossnate EM30, an isocyanate master batch which is produced by Dainichi Seika Colour & Chemicals Mfg. Co., Ltd., contains 30 wt % of 4,4'-diphenylmethane diisocyanate (concentration of amine reverse-titrated isocyanate according to JIS-K1556, 5 to 10 wt %), and in which the base resin is a polyester elastomer.

Hardness (mm)

The deformation when subjected to a load of 980 N (100 kg) was measured.

Initial Velocity (m/s)

Determined in accordance with the USGA (R&A) measurement method.

Scuff Resistance

The ball was held at respective temperatures of 23° C., 13° C. and 0° C. Using a swing robot machine, each ball was hit with a pitching wedge as the club at a head speed of 33 m/s, after which damage from the impact was visually rated according to the following criteria.

5: No damage at all or substantially free of apparent damage.
4: Slight damage observed, but of a substantially negligible degree.
3: Surface somewhat frayed.
2: Surface frayed and portions of dimples missing.
1: Some dimples completely obliterated.

Manufacturability

Good: Molding conditions during mass production were stable; problems such as resin scorching rarely occurred.
NG: Molding conditions during mass production were unstable; problems such as resin scorching frequently occurred.

The invention claimed is:

1. A golf ball comprising a core and one or more cover layers which enclose the core, the ball being characterized in that at least one cover layer is made primarily of a thermoplastic polyurethane obtained by a polyurethane forming reaction of an organic polyisocyanate compound with a long-chain polyol and a chain extender, and satisfies conditions (1) to (3) below:
  (1) the long-chain polyol includes a copolymeric polycarbonate polyol having a number-average molecular weight of 400 to 4,000;
  (2) the thermoplastic polyurethane present in the cover material (after molding) has an inherent viscosity, as measured in DMF, of more than 1.5 dl/g; and
  (3) the thermoplastic polyurethane present in the cover material (after molding) has an inherent viscosity, as measured in a DMF solution containing 0.05 mol/L of n-butylamine, of at least 0.5 dl/g.

2. The golf ball of claim 1, wherein the thermoplastic polyurethane has a Shore D hardness of 35 to 70 and the copolymeric polycarbonate polyol includes at least one selected from the group consisting of poly(pentamethylene-co-hexamethylene carbonate) diol, poly(tetramethylene-co-hexamethylene carbonate) diol, poly(3-methyl-1,5-pentamethylene-co-hexamethylene carbonate) diol, poly(nonamethylene-co-hexamethylene carbonate) diol and poly(2-methyl-1,8-octamethylene-co-nonamethylene carbonate) diol.

3. The golf ball of claim 1, wherein the long-chain polyol additionally includes polytetramethylene glycol.

4. The golf ball of claim 1, wherein the copolymeric polycarbonate polyol accounts for 10 to 100 wt % of the long-chain polyol.

5. The golf ball of claim 2, wherein the hexamethylene carbonate unit content as a proportion of the copolymeric polycarbonate polyol is 1 to 80 wt %.

6. The golf ball of claim 1, wherein the thermoplastic polyurethane accounts for at least 90 wt % of the cover material.

* * * * *